April 2, 1946.   D. G. C. HARE   2,397,661
RADIATION DETECTOR
Filed Sept. 16, 1944

INVENTOR
D. G. C. HARE.
BY
ATTORNEY

Patented Apr. 2, 1946

2,397,661

UNITED STATES PATENT OFFICE 2,397,661

RADIATION DETECTOR

Donald G. C. Hare, Roslyn, N. Y., assignor to The Texas Company, New York 17, N. Y., a corporation of Delaware Application September 16, 1944, Serial No. 554,420

6 Claims. (Cl. 250—83.6)

This invention relates to the detecting and measurement of penetrative radiation and more particularly to a device of the Geiger counter type for measuring the intensity of such radiation as gamma rays.

The principal object of the invention is to provide a device of this type which will have an efficiency much higher than the ordinary or conventional Geiger counter, which will be relatively simple to manufacture and which will be sufficiently rugged to enable it to be used in comparatively rough service such, for instance, as in the logging of wells or bore holes.

This application is a continuation-in-part of my copending application Serial No. 412,617 filed September 27, 1941.

In accordance with the invention, a radiation detecting device is formed preferably of one or more conducting cathode plates, in the surface of which one or more holes have been formed to allow the passage of fine anode wires in a direction which may be substantially perpendicular to the plane of the plates. If a plurality of plates are used, they may be arranged substantially parallel to each other and separated a relatively small distance, and the plates are so oriented that the holes of the plates are in substantial alignment so that an anode wire can be disposed through the center of each series of holes to provide the proper electrical field concentration. The device comprising the cathode and the anode is housed in an envelope of glass, metal or other suitable material, the envelope being preferably filled with a gas, or rather a gaseous mixture, containing argon and a small amount of a low, or relatively low, boiling hydrocarbon of commercial purity such as petroleum ether. This may be either a pure hydrocarbon boiling within the range of petroleum ether or it may be a mixture of two or more of the constituent hydrocarbons present in petroleum ether. The gaseous mixture within the counter is preferably at a pressure of about 20 inches of mercury.

For a better understanding of the invention reference may be had to the accompanying drawing in which.

Figure 1:
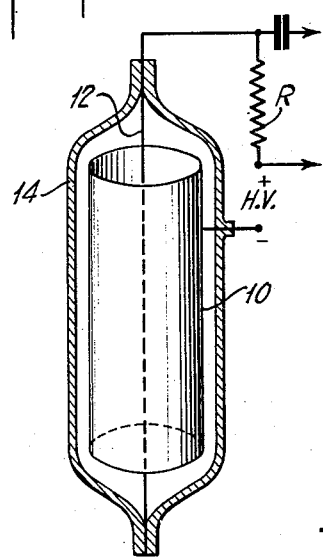
Figure 1 is a diagrammatic view of a Geiger counter of the conventional type.

The conventional Geiger counter shown in Figure 1 consists of a thin-walled metal tube 10 with a very thin wire, comprising the anode 12, spanned axially and insulated from the metal tube forming the cathode. These electrodes are enclosed in an envelope 14, commonly a glass tube, which contains a gas, e. g. argon, at a fairly low pressure, say 5–10 cm. of mercury. The central wire 12 is maintained at a positive potential with respect to the cylinder, and a fairly high resistance R is placed in the circuit. Normally the potential difference between the cathode 10 and wire 12 is nearly but not quite high enough to cause a discharge to take place. If a particle capable of ionizing the gas passes through the cylinder 10, a discharge may take place with a current flow of the order of a few microamperes. This causes a large voltage drop across R and the discharge will cease after a very short period of time. By suitably amplifying the surden voltage drop across R, a mechanical recorder or other device capable of registering the discharges of the counter may be actuated. After the discharge has ceased, the counter is again in a condition to register the passage of an ionizing particle.

Because of the large ionization per unit path length of such radiation as cosmic or beta rays, even in the relatively low density of the gas in the counter, the efficiency of the conventional counter for such rays is very nearly 100%. However, the probability of a gamma ray causing ionization in the gas is almost vanishingly small, and practically all the counts due to the passage of gamma rays are due to the electrons ejected from the cathode wall 10 by the interaction of the gamma ray with the atoms of the cathode material. The probability of such an interaction taking place will, of course, increase with increasing cathode-wall thickness, but since the range in the cathode material of an electron receiving energy from the gamma ray is seldom greater than one-tenth or two-tenths of a millimeter, nothing is to be gained by making the wall 10 thicker than about twice the average range of the particles. At this thickness about one out of every one hundred gamma rays traversing the cathode will eject an electron so as to "trigger" or discharge the counter. This probability or efficiency is somewhat dependent on the material used as the cathode 10 and on the amount of surface exposed, but all these factors will not cause any variation of efficiency by more than a factor of about two from that of a simple counter with the optimum wall thickness. It is to be pointed out that the efficiency is practically independent of the size of the counter, a very small counter having nearly the same optimum efficiency as a very large one.

We define the efficiency of a counter as the ratio of the number of counts to the number of rays traversing the cathode area. For a parallel beam of gamma rays one can, of course, increase this ratio by using several counters, one behind the other and connected in parallel. If we have N counters, each with an efficiency E, the efficiency of the combination would be nearly NE. However, a parallel beam of gamma rays is a practical impossibility and does not occur in nature.

Figure 2:
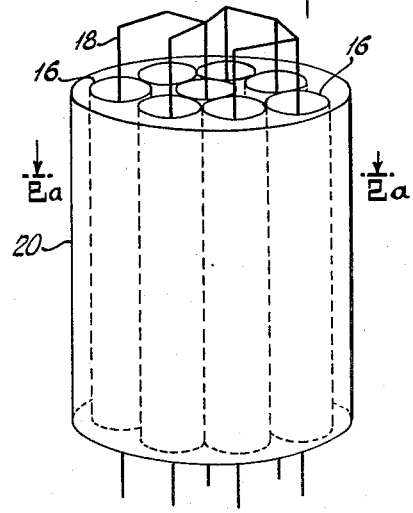
Figure 2 shows one arrangement of a group of conventional counters and Figure 2A is a sectional view on line 2a—2a of Figure 2.
Figure 2A:
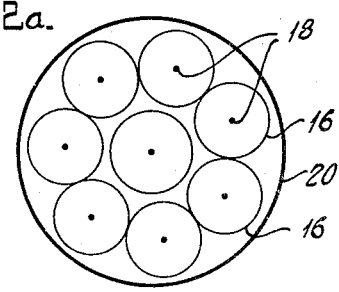

Another obvious way of obtaining a higher efficiency in a given counter volume is to replace the single large counter with a bundle of small counters which may be arranged as shown in Figures 2 and 2A. These figures show a bundle of eight small counters having cathodes 16 and anodes 18 arranged with an envelope 20. The cylinders 16 are connected together electrically to form the cathode, while the wires 18 are shown as connected electrically to form the anode. However, unless the lateral cross-section of the available counter volume is very large it is not possible to get a very large gain in efficiency unless one uses a large number of very small counters. For example, if we have a lateral cross-section 3 inches in diameter, we could use seven 1-inch counters which would give us an increase in efficiency by a factor of seven-thirds. In order to get an increase in efficiency by a factor of ten it would be necessary to use over 120 counters, each one smaller than one-quarter inch in diameter. It is extremely difficult to secure the necessary uniformity of operation with such a large number of thin-walled tubes and the difficulties encountered will quite obviously increase rapidly with the length of the counter.

In Figures 2 through 5 the housing or envelope has been omitted in order to simplify the drawing. It is understood that each of the devices shown in these figures will be housed in a suitable metal casing or in a glass envelope which may be similar to the envelope 14 of Figure 1.

Figure 3:
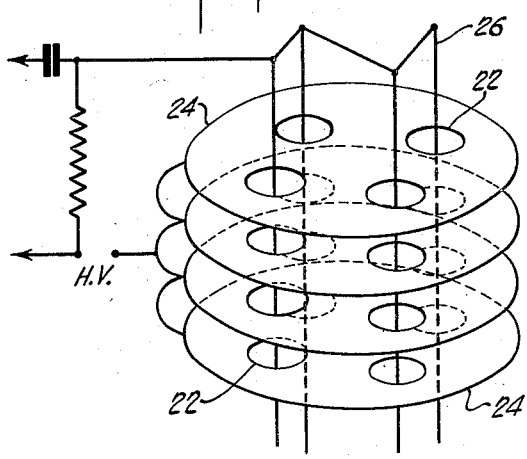
Figure 3 is a diagrammatic representation of one embodiment of the invention.
Figure 4:
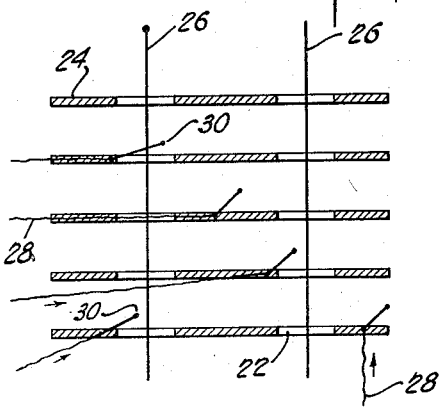
Figures 4 and 5 are, respectively, a vertical elevation and a plan view of the embodiment of Figure 3.
Figure 5:
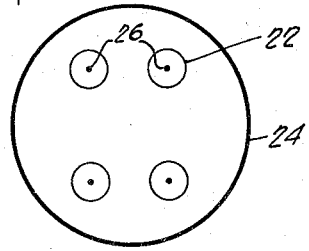

In Figures 3, 4 and 5 an embodiment of the invention is shown in which the conventional counter cathode tube has been replaced by properly aligned plate holes 22 formed in a plurality of plate members 24 shown as being arranged substantially parallel to each other and in slightly separated relation. The plate members 24 are connected electrically to form the cathode while the wires 26 passing through the holes 22 may be connected together to form a single anode. That the normal cathode tube can be replaced by the plate holes is obvious if we consider the fact that if we leave no space between the plates, this counter becomes a group of conventional counters with very thick walls and it is also apparent that if the spacing between the plates 24 is small compared to the diameter of the holes 22, there will be very little electrical difference between this and the conventional counter. Actually it has been found, however, that the counter will function satisfactorily with only one plate present. The electrical characteristics of such a counter using a plurality of plates are very similar to those of a conventional counter whose diameter is that of the plate holes and whose gas filling is the same. From the standpoint of efficiency, however, this new type of counter offers a great improvement over the conventional counter, as will be made clear by reference to Fig. 4 and the following discussion.

As has previously been pointed out, the probability of a gamma ray causing ionization in the gas filling of the counter is extremely small and for a gamma ray to trip the counter it is practically always necessary that the gamma ray interact with the matter of the cathode with the consequent ejection of an electron. The probability of such interaction taking place increases with the increasing thickness of the cathode wall, but due to the short range of the ejected electrons in the cathode material in a conventional counter, we are limited to a cathode thickness of the order of less than 1 mm. Referring, however, to the present invention as depicted in an enlarged cross-sectional view in Fig. 4, we see that there is an opportunity for the gamma rays 28 to pass through a large amount of cathode material with a consequent high probability of interaction, together with a good probability that the ejected electron 30 will not have to travel too great a distance in the cathode 24 before getting out. Because of this factor of offering a large matter path for the gamma ray with a short path for the ejected electron, it is seen then that each unit which may be thought of as one anode wire passing through a series of holes will appear from the standpoint of efficiency to act like a conventional counter many times the diameter of the holes. Actually it has been found that counters of this type in which each cathode plate of one inch external diameter has a single hole of $\frac{1}{16}$ inch diameter with a plate spacing of approximately $\frac{1}{16}$ inch gave the same number of counts per second as a conventional counter 1⅜ inches in diameter when both were exposed to the same radiation. Consequently, if one makes a relatively small number of reasonably small sized holes in the plates, the resulting counter will have an efficiency which could be achieved in the same form by a bundle of conventional counters only by using an unreasonably large number of very small counters.

It has been found that an argon-petroleum ether mixture of approximately 97 per cent argon and 3 per cent petroleum ether is very satisfactory as the gaseous filling for the counter which has been described. Furthermore, with a filling of this kind the counter pulses or discharges are suitably quenched, thus enabling the counter to recover quickly after each discharge to permit rapid counting.

It is preferred that, prior to filling the counter casing with the gaseous mixture, the cathode plate surfaces be oxidized as by heating in an atmosphere of air.

Obviously many modifications and variations of the invention, as hereinbefore set forth, may be made without departing from the spirit and scope thereof and, therefore, only such limitations should be imposed as are indicated in the appended claims.

I claim:

1. A radiation detecting device comprising a casing, a plurality of plates disposed in said casing in separated relation and connected together electrically to form a cathode member, each plate being provided with at least one hole and the holes in the plates being disposed in alignment, an anode member comprising a wire extending through said aligned holes and insulated from said cathode plates, and a gaseous filling in said housing, said filling comprising a mixture of argon and petroleum ether.

2. A radiation detecting device comprising an hermetically sealed casing, a plurality of plates disposed in said casing in separated relation and connected together electrically to form a cathode member, each plate being provided with at least one hole and the holes in the plates being disposed in alignment and each plate being provided with an oxidized surface, an anode member comprising a wire extending through said aligned holes and insulated from said cathode plates, and a gaseous filling in said housing, said filling comprising a mixture of substantially 97% argon and 3% petroleum ether.

3. A radiation detecting device comprising a closed housing, a plurality of metal sheets disposed in a bank in said housing in parallel, separated relation and connected together electrically to form a cathode, said bank of sheets being provided with a plurality of series of holes, the holes in each series being in alignment, an anode formed of a plurality of fine wires, each wire being disposed on the longitudinal axis of a series of said holes, and a gas filling in said housing, said gas being composed of a mixture of substantially 97% commercially pure argon and 3% petroleum ether at a pressure of substantially 20 inches of mercury.

4. A device for detecting gamma radiation comprising a housing, a plurality of plates in said housing arranged in a parallel bank and connected together electrically to form a cathode, the plates being separated slightly to form spaces therebetween and said bank of plates being provided with a plurality of holes disposed in parallel lines extending transversely through said bank, an anode wire extending through the center of each line of holes, said wires forming an anode, and a gaseous filling in said housing, said filling comprising mainly argon and a small amount of petroleum ether.

5. A device for detecting gamma radiation comprising a container, a plurality of plates in said container arranged in a parallel bank and connected together electrically to form a cathode, the plates being separated slightly to form spaces therebetween and said bank of plates being provided with a plurality of holes disposed in parallel lines extending transversely through said bank, an anode wire extending through each line of said holes, said wires being connected together electrically to form an anode, and a gaseous filling of argon and petroleum ether in said container, said filling being under a subatmospheric pressure.

6. A radiation detecting device comprising a closed housing, a plurality of thin metal plates disposed in said housing in parallel, separated relation in a bank and connected together electrically to form a cathode, said bank of plates being provided with a plurality of series of holes, the holes in each series being in alignment, an anode formed of a plurality of fine wires, each disposed through a series of said holes, each of said cathode plates being provided with an oxidized surface, and a gas filling in said housing, said gas being composed of a mixture of argon and petroleum ether.

DONALD G. C. HARE.